United States Patent [19]

Bainard et al.

[11] E Patent Number: Re. 33,192

[45] Reissued Date of Patent: Apr. 3, 1990

[54] METHOD OF MOLDING AN ELASTOMERIC SHAFT SEAL WITH A POLYTETRAFLUOROETHYLENE LINER SIMULTANEOUSLY FORMED THEREON

[75] Inventors: Dean R. Bainard, Clover, S.C.; Dennis N. Denton, Besemer, N.C.

[73] Assignee: Garlock, Inc., Palmyra, N.Y.

[21] Appl. No.: 539,225

[22] Filed: Oct. 6, 1983

Related U.S. Patent Documents

Reissue of:

[64] Patent No.: 4,171,561
Issued: Oct. 23, 1979
Appl. No.: 746,392
Filed: Dec. 1, 1976

U.S. Applications:

[63] Continuation of Ser. No. 313,273, Oct. 21, 1981, abandoned.

[51] Int. Cl.[4] ..... B29C 65/02

[52] U.S. Cl. ..... 264/266; 29/527.1; 264/268; 264/275; 277/153; 425/DIG. 47

[58] Field of Search ..... 277/137, 152, 153, 26, 277/227, 229, 134; 264/161, 248, 275, 260, 266, 268, 262, 263, 163; 29/527.1; 425/DIG. 47

[56] References Cited

U.S. PATENT DOCUMENTS

| | | | |
|---|---|---|---|
| 2,717,025 | 9/1955 | Jelinek | 277/229 |
| 2,804,324 | 8/1957 | Stallings . | |
| 2,868,575 | 1/1959 | Hawxhurst | 277/229 |
| 2,932,535 | 4/1960 | Peickii et al. | 277/227 |
| 3,276,115 | 10/1966 | Hansz | 264/268 X |
| 3,462,333 | 8/1969 | McCormick et al. | 425/DIG. 47 |
| 3,493,645 | 2/1970 | Sanderson et al. | 264/268 X |
| 3,495,843 | 2/1970 | Andersen et al. | 277/153 |
| 3,806,398 | 4/1974 | Lasser . | |
| 3,895,814 | 7/1975 | Kupfert et al. | 277/134 X |
| 3,972,975 | 8/1976 | Noda . | |
| 3,973,781 | 8/1976 | Grörich | 277/134 |
| 3,984,113 | 10/1976 | Bentley | 277/134 |
| 3,985,487 | 10/1976 | Clark | 425/DIG. 47 |
| 4,006,210 | 2/1977 | Denton | 425/DIG. 47 |
| 4,084,826 | 4/1978 | Vossieck et al. | 277/134 |
| 4,159,298 | 6/1979 | Bainard | 425/DIG. 47 |
| 4,578,856 | 4/1986 | Butler . | |
| 4,613,143 | 9/1986 | Butler . | |

FOREIGN PATENT DOCUMENTS

| | | |
|---|---|---|
| 46-23681 | 7/1971 | Japan . |
| 467935 | 6/1937 | United Kingdom . |

*Primary Examiner*—Allan N. Shoap
*Attorney, Agent, or Firm*—Sixbey, Friedman, Leedom & Ferguson

[57] ABSTRACT

A shaft seal (and method for making the same) of the type having an annular elastomeric body, a molded lip, and the molded lip having a liner of sintered polytetrafluoroethylene bonded thereto. The elastomer is molded simultaneously with the polytetrafluoroethylene liner being formed and bonded to the elastomer. The method for making the seal employs the same mold used to make common, molded lip elastomeric seals.

28 Claims, 2 Drawing Sheets

FIG. 1
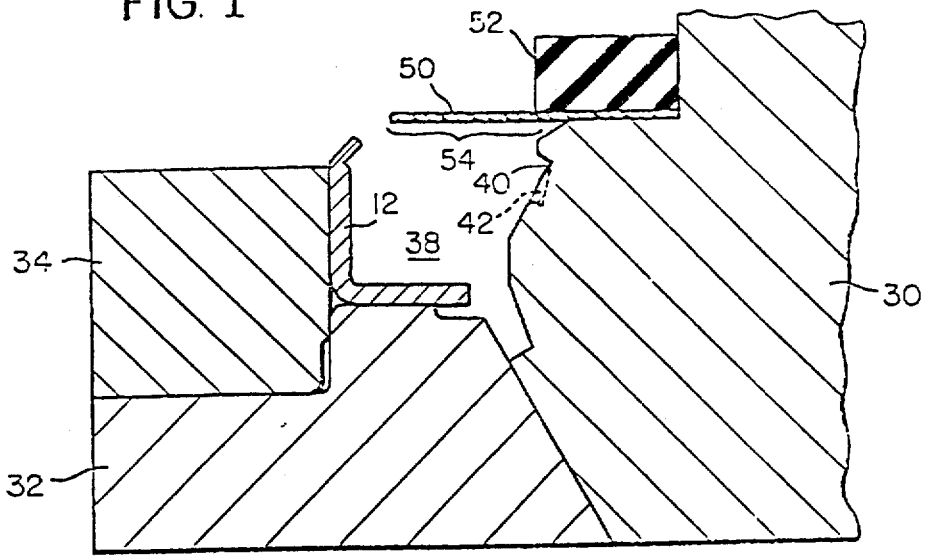
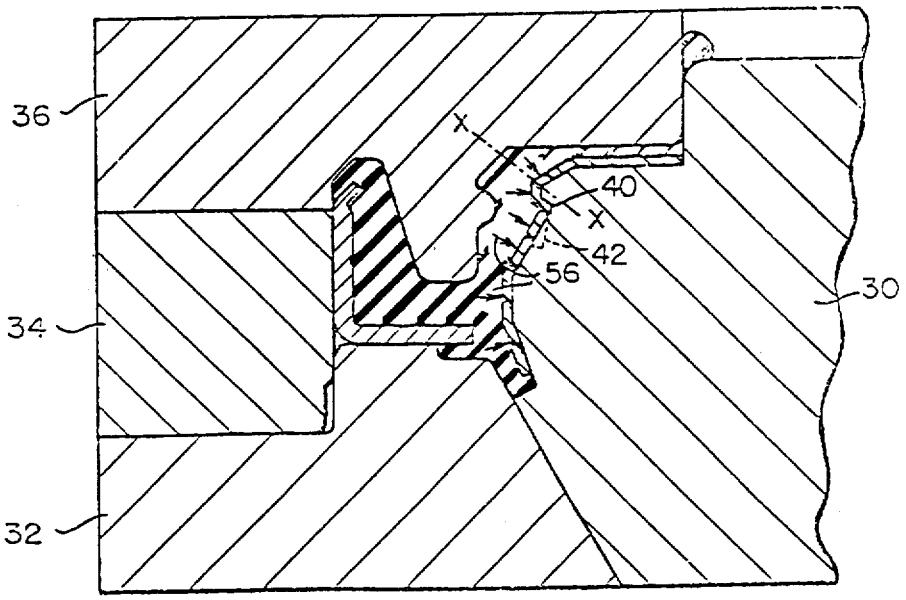
FIG. 2

METHOD OF MOLDING AN ELASTOMERIC SHAFT SEAL WITH A POLYTETRAFLUOROETHYLENE LINER SIMULTANEOUSLY FORMED THEREON

Matter enclosed in heavy brackets [ ] appears in the original patent but forms no part of this reissue specification; matter printed in italics indicates the additions made by reissue.

*CROSS REFERENCE TO RELATED APPLICATION*

*This application is a continuation of application Ser. No. 313,273, filed Oct. 21, 1981, and now abandoned, and which is a reissue application for U.S. Pat. No. 4,171,561 which was issued on Oct. 23, 1979 on application Ser. No. 746,392. Application Ser. No. 746,392 was filed on Dec. 1, 1976.*

BACKGROUND OF THE INVENTION

1. Field of the Invention

This invention relates to shaft seals and in particular to elastomeric molded lip shaft seals having a polytetrafluoroethylene wear surface.

2. Description of the Prior Art

Polytetrafluoroethylene seals are presently being manufactured for severe sealing applications, however, these polytetrafluoroethylene seals require new mold tooling in order to be manufactured. Some of the advantages of the polytetrafluoroethylene seal are obtained by applying a polytetrafluoroethylene coating to molded elastomeric seals. For example, it is also known to form a molded elastomeric shaft seal and then to coat the sealing element with a thin layer of polytetrafluoroethylene as by spraying or dipping (see U.S. Pat. No. 2,932,535). A process for allegedly forming a multiple material seal having an inside made of a less expensive material and a liner of Viton or allegedly Teflon is described in U.S. Pat. No. 3,493,645. It is also known to form an annular shaft seal of the type having a trimmed lip by using a standard mold and placing a polytetrafluoroethylene ring in the mold with a pre-form of elastomer on top of the ring, such that when the mold closes the elastomeric material forms the polytetrafluoroethylene ring into a liner. After the molded seal is removed from the mold cavity it is trimmed at a critical location to produce a trimmed lip at a predetermined point; the polytetrafluoroethylene liner will therefore exist bonded to the molded elastomer from the contact point of the sealing lip axially outwardly in one direction only away from the lip. A method for making shaft seals having a trimmed lip (but without a polytetrafluoroethylene liner) is shown generally in U.S. Pat. No. 3,276,115 wherein the trimming is done along line X—X in FIG. 6 thereof.

It is an object of the present invention to provide an elastomeric shaft seal of the molded lip type and a method for making such seals using only the same tooling used in making common molded lip elastomeric seals.

SUMMARY OF THE INVENTION

An annular molded elastomeric shaft seal of the molded lip type (and method for making the same) having a bonded liner of sintered polytetrafluoroethylene formed from a ring of sintered polytetrafluoroethylene, the molding, forming, and bonding all being done simultaneously using a standard mold of the type used to mold a common elastomeric molded lip seal.

BRIEF DESCRIPTION OF THE DRAWINGS

The present invention will be more fully understood by reference to the following detailed description thereof, when read in conjunction with the attached drawings, wherein like reference numerals refer to like elements and wherein:

FIGS. 1 and 2 are partial cross-sectional views through a mold showing the method of the present invention.

DETAILED DESCRIPTION OF THE PREFERRED EMBODIMENT

Figure 3:
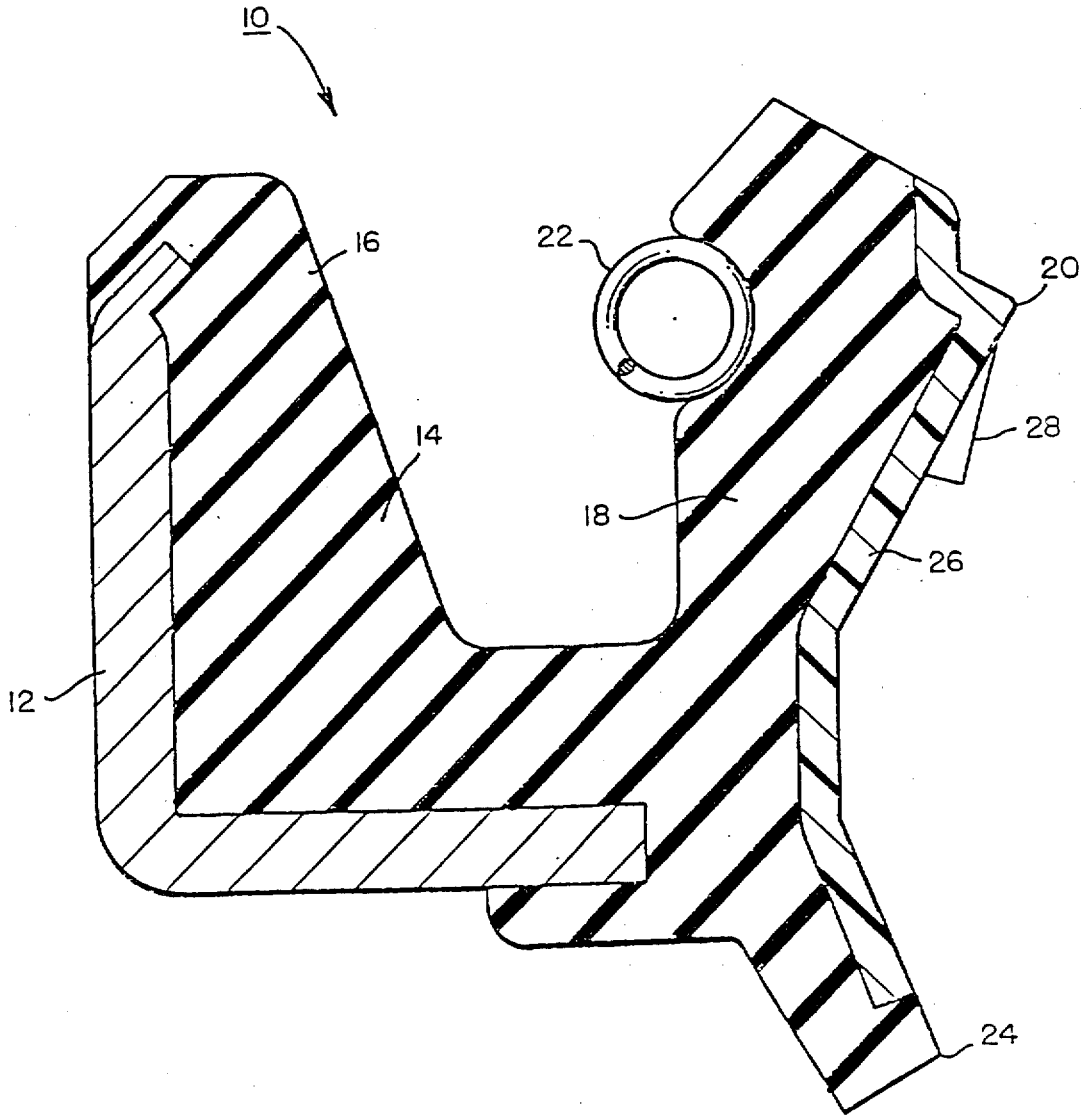
FIG. 3 is a partial cross-sectional view of a molded lip seal with a polytetrafluoroethylene liner according to the present invention.

With reference now to the drawings, FIGS. 1 and 2 show the method of the present invention and FIG. 3 shows a seal in accordance with the present invention. Referring first to the seal of the present invention, FIG. 3 shows a shaft seal 10 of the type having a molded lip 20 and a liner 26 of sintered polytetrafluoroethylene. These are the basic features of a seal according to this invention; thus, while the preferred seal is shown, the present invention is not limited thereto but encompasses all molded lip seals.

The seal 10 also comprises an annular metal shell 12 to which a molded elastomeric body 14 is bonded. The elastomeric body 14 includes a heel portion 16, a flexible portion 18, and an auxiliary or dust lip 24 and carrys a garter string 22. The liner 26 can have hydrodynamic pumping elements 28 of any known shape, size or configuration, if desired. The pumping elements 28 are formed on the liner 26 during the molding process of the present invention, as described below.

The method of the present invention will now be described with reference to FIGS. 1 and 2 showing the molding technique of the present invention. FIGS. 1 and 2 show a standard mold for a conventional elastomeric molded lip shaft seal including a mold core 30, a lower die member 32, a centering ring 34 and a moveable upper die member 36. The mold is shown in its open position in FIG. 1 and in its closed position in FIG. 2. The mold defines a mold cavity 38 having a molded-lip groove 40 for forming the molded lip of the seal 10. Adjacent the molded-lip groove 40, one or more recesses 42 (one of which appears in dotted line in FIGS. 1 and 2) can be provided if desired, for forming hydrodynamic pumping elements 28.

In the process of the present invention, a ring or washer 50 of sintered polytetrafluoroethylene is placed on the mold core 30 as shown in FIG. 1 and a pre-form 52 of elastomeric material is placed on top of the ring 50. The ring 50 includes a portion 54 that extends radially out into the cavity 38 a sufficient distance such that the portion 54 will extend past the molded-lip groove 40 when the mold is closed and the ring 50 is formed into the liner 26. When the mold is closed, as shown in FIG. 2, the upper die member 36 is forced to move downwardly by a standard press causing the elastomer in the pre-form 52 to flow down into the cavity 38 behind the ring 50, causing the ring 50 to move down and against the mold core 30 under the hydraulic pressure (illustrated by the arrows 56 in FIG. 2) exerted thereon by the flowing elastomer. It is noted that the polytetrafluoroethylene ring 50 is "formed" as contrasted to the elastomer which "flows" under pressure. The sintered polytetrafluoroethylene of the ring 50 will not flow (although it may stretch slightly). The hydraulic pressure forms the ring 50 into the liner 26 and forces a portion of the ring 50 into the groove 40 to form the molded lip 20. The excess elastomer and liner material are removed by trimming along line X—X in FIG. 2. The elastomer is molded and simultaneously therewith the polytetrafluoroethylene liner is formed and bonded to the elastomer. The mold is then opened, the seal 10 is removed, and the process is repeated.

As will be understood from the above description, the shaft seal 10 can be manufactured utilizing the same identical tooling that is used for making common elastomeric type seals (such as, for example, the seal of FIG. 3 but without the liner 26). The present invention can be used to make any seal of the type having a molded lip, for example, whether or not the lip is on the I.D. or the O.D. or it is a wafer seal. While the polytetrafluoroethylene liner 26 preferably covers that portion of the elastomer shown in FIG. 2, such is not essential, however, the liner should cover the molded lip 20 on each axial side of the lip to a distance of at least about twice the thickness of the ring 50. The thickness of the ring 50 used in the present invention is from about 0.010 inch to 0.050 inch, and is preferably between 0.015 and 0.030 inch thick. Thus, if the ring has a thickness of about 0.030 inch, the liner 26 should extend axially at least 0.060 inch on each side of the lip 20. The ring 50 can be treated as known in the art to aid in bonding it to the elastomer, such as by a chemical etch and cement if desired. As stated above, the present invention is applicable to any shape or design of a shaft seal having a molded lip and is not limited to particular designs shown in FIGS. 1—3. For example, the metal shell 12 is not essential to the present invention nor are the hydrodynamic pumping elements 28, although they can be formed, if desired, using the same tooling recesses 42 as would be used for producing a common molded elastomeric seal without a polytetrafluoroethylene liner. The thickness of the liner 26 according to the present invention is closely controlled and is very uniform. This is an advantage especially in high speed and in dry applications in which prior seals having a polytetrafluoroethylene coating of varying thickness would fail due to failure at the thinnest areas of the coating. The term "liner" as used in the present invention is hereby defined to means a separate, integral element bonded to the elastomer backing, in contrast to a thin, sprayed-on or dipped-on coating, for example. In addition, as will be understood by those skilled in the art, the term "form" is hereby defined for use in the present specification and claims to mean bent and reshaped (and to exclude "flowing") as is the case with the sintered polytetrafluoroethylene ring used in this invention, in contrast to the flowing of the elastomer pre-form 52.

The invention has been described in detail with particular reference to the preferred embodiments thereof, but it will be understood that variations and modifications can be effected within the spirit and scope of the invention as described hereinabove and as defined in the appended claims.

We claim:

1. A method for making a shaft seal of the *molded lip* type including an annular elastomeric body [,] *having* a molded lip and the molded lip having *a sealing edge and axial sides on opposites of said sealing edge and* a liner of sintered polytetrafluoroethylene, comprising:

(a) molding [, at a temperature in the range of from about 300° to 450° F.,] an annular elastomeric body *at a temperature at which the elastomeric body will flow and the polytetrafluoroethylene will not*; and (b) simultaneously with said molding step, forming a ring of sintered polytetrafluoroethylene into a liner on said elastomeric body in the shape of [a] *the* molded lip and bonding said liner to *the surface of both axial sides of the molded lip of* said elastomeric body *by hydraulic pressure exerted by the elastomer of the elastomeric body during formation of the molded lip during said molding step.*

2. The method according to claim 1 wherein said simultaneously forming step comprises lining said body for at least 0.060 inch on each axial side of said molded lip.

3. The method according to claim 1 wherein said simultaneously forming step includes forming hydrodynamic pumping elements on a shaft-engaging surface of said liner.

4. The method according to claim 1 wherein said simultaneously forming step comprises placing said ring of sintered polytetrafluoroethylene in a standard mold cavity having a molded-lip groove of the type for use in making an elastomeric, molded lip seal, and forcing elastomeric material into said mold cavity from behind said ring to force said ring against and into said molded-lip groove to form said ring as a polytetrafluoroethylene liner with a molded lip.

5. The method according to claim 4 wherein said placing step comprises placing said ring in said mold cavity at a location spaced away from said molded-lip groove such that said ring is out of contact with said molded-lip groove.

6. The method according to claim 4 wherein said placing step comprises placing a polytetrafluoroethylene ring having a thickness of about 0.010–0.050 inch in said mold cavity.

7. The method according to claim 4 wherein said placing step includes placing said ring in said cavity such that at least a portion thereof extends radially out into the cavity a sufficient distance such that said portion will extend past said molded-lip groove during said forcing step.

8. The method according to claim 7 wherein said simultaneously forming step comprises lining said body for at least 0.060 inch on each axial side of said molded lip.

9. The method according to claim 8 wherein said simultaneously forming step includes forming hydrodynamic pumping elements on a shaft-engaging surface of said liner.

10. The method according to claim 9 wherein said placing step comprises placing a polytetrafluoroethylene ring having a thickness of about 0.010–0.050 inch in said mold cavity.

11. The method according to claim 10 wherein said placing step comprises placing said ring in said mold cavity at a location spaced away from said molded-lip groove such that said ring is out of contact with said molded-lip groove.

12. The method according to claim 1 wherein said molding step comprises compression molding said elastomeric body from a pre-form of elastomer, and said forming step comprises forming a flat ring of sintered polytetrafluoroethelene into said liner.

13. A method for making a shaft seal of the *molded lip* type including an annular elastomeric body [,] *having* a molded lip, and the molded lip having a liner of sintered polytetrafluoroethylene, comprising the steps of:

(a) compression molding [, at a temperature in the range of from about 300° to 450° F.,] said elastomeric body from an elastomer pre-form, *at a temperature at which the elastomer pre-form will flow and the polytetrafluoroethylene will not,* while simultaneously foming said liner and bonding said formed liner [to] *on the surface of* said elastomeric body, and (b) said forming step comprising:

(1) placing, beneath said pre-form, a ring of sintered polytetrafluoroethylene in a mold cavity having *a wall surface with* a molded-lip groove *formed therein* with at least a portion of said ring extending radially out into the seal cavity a sufficient distance such that it will extend *from a portion of said wall surface located on a first side of said groove* past said groove *onto a second portion of said wall surface located on an opposite side of the groove* when formed in the direction of said groove, and (2) closing the mold to cause said elastomer to flow and [force] *exert a hydraulic pressure forcing* said ring against and into said groove, forming said ring [as] *into* a liner [with a] *having the shape of said* molded lip.

14. The method according to claim 13 wherein said placing step comprises placing said ring in said mold cavity at a location spaced away from said molded-lip groove such that said ring is out of contact with said molded-lip groove.

*15. A method for making a shaft seal of the type including an annular elastomeric body and a liner of sintered polytetrafluoroethylene on a shaft engaging surface of said seal, comprising the steps of:*

*(a) placing a ring of sintered polytetrafluoroethylene on a core that forms a portion of a mold cavity of a mold, said core having at least one recess, with axial sides, in a surface thereof which contacts and defines the shaft engaging surface of said seal:*

*(b) placing a pre-form of elastomer in said mold cavity above said ring; said pre-form having a volume greater than the volume of the mold cavity when closed;*

*(c) compression molding said elastomeric body from said pre-form, at a temperature at which the elastomer will flow and the polytetrafluoroethylene will not, while simultaneously forming said liner from said ring and bonding said formed liner onto a surface of said elastomeric body, said forming step comprising forcing said elastomer to flow against said ring and hydraulically force said ring against and into said at least one recess to form said liner with a ridge, having axial sides on opposite sides of an edge thereof and corresponding to the shape of the recess in the mold surface that defines the shaft engaging surface of said seal; and*

*(d) opening the mold and removing the seal therefrom.*

*16. The method according to claim 15 wherein said at least one recess includes a hydrodynamic pumping element groove and wherein said ridge is a hydrodynamic pumping element.*

*17. The method according to claim 16 wherein said at least one recess is a plurality of hydrodynamic pumping element grooves and wherein said corresponding ridge is a plurality of hydrodynamic pumping elements.*

*18. The method according to claim 15 wherein said surface of said core is a conical surface.*

*19. The method according to claim 15 including placing an annular metal shell in said mold cavity and bonding said elastomeric body to said shell.*

*20. The method according to claim 15 wherein said at least one recess includes at least one edge where two flat surfaces of said recess meet with a v-shaped cross-section.*

*21. The method according to claim 15 wherein the cross-sectional shape of the radially innermost portion of said at least one recess is v-shaped.*

*22. The method according to claim 15 wherein said ring placing step includes placing said ring in said cavity such that at least a portion thereof extends radially out into the cavity a sufficient distance such that said portion will extend past said recess during said forcing step.*

*23. The method according to claim 22 wherein said simultaneously forming step comprises lining said body for at least 0.060 inch on each axial side of said recess.*

*24. The method according to claim 23 wherein said ring placing step comprises placing said ring in said mold cavity at a location spaced away from said recess such that said ring is out of contact with said recess.*

*25. The method according to claim 24 wherein said pre-form placing step comprises placing said pre-form directly on top of said ring.*

*26. The method according to claim 25 wherein said surface of said core is a conical surface.*

*27. The method according to claim 25 including placing an annular metal shell in said mold cavity and bonding said elastomeric body to said shell.*

*28. The method according to claim 27 wherein at least one said recess includes at least one edge where two flat surfaces of said groove meet with a v-shaped cross-section.*

* * * * *